(12) United States Patent
Byun et al.

(10) Patent No.: US 9,028,993 B2
(45) Date of Patent: May 12, 2015

(54) SECONDARY BATTERY

(75) Inventors: Sang-Won Byun, Yongin-si (KR);
Soo-Kyoung Yoo, Yongin-si (KR);
Heung-Tack Shim, Yongin-si (KR);
Min-Yeol Han, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 923 days.

(21) Appl. No.: 12/805,743

(22) Filed: Aug. 18, 2010

(65) Prior Publication Data

US 2011/0104528 A1   May 5, 2011

(30) Foreign Application Priority Data

Oct. 30, 2009   (KR) .................. 10-2009-0104307

(51) Int. Cl.
*H01M 2/00* (2006.01)
*H01M 2/12* (2006.01)
*H01M 2/26* (2006.01)
*H01M 2/34* (2006.01)
*H01M 10/04* (2006.01)

(52) U.S. Cl.
CPC .......... *H01M 2/1252* (2013.01); *H01M 2/1241* (2013.01); *H01M 2/263* (2013.01); *H01M 2/347* (2013.01); *H01M 10/0431* (2013.01); *H01M 2200/00* (2013.01)

(58) Field of Classification Search
None
See application file for complete search history.

(56) References Cited

U.S. PATENT DOCUMENTS

| 6,838,207 | B1 * | 1/2005 | Sugita ............................ 429/82 |
| 2005/0287429 | A1 | 12/2005 | Cho et al. |
| 2007/0054157 | A1 | 3/2007 | Ryu et al. |
| 2010/0279170 | A1 * | 11/2010 | Lee et al. ...................... 429/178 |
| 2011/0052949 | A1 * | 3/2011 | Byun et al. ..................... 429/61 |

FOREIGN PATENT DOCUMENTS

| EP | 1487032 A1 | 12/2004 |
| EP | 1717886 A2 | 11/2006 |
| JP | 2004-319463 A | 11/2004 |
| JP | 2008-041264 A | 2/2008 |
| JP | 2008041264 A * | 2/2008 |
| KR | 10 2005-0121907 A | 12/2005 |

OTHER PUBLICATIONS

Korean Office Action in KR 10-2009-0104307, dated Mar. 22, 2011 (Byun, et al.).
European Search Report in EP 10189339.4-2119, dated Mar. 3, 2011 (Byun, et al.).

* cited by examiner

*Primary Examiner* — Patrick Ryan
*Assistant Examiner* — Stephan Essex
(74) *Attorney, Agent, or Firm* — Lee & Morse, P.C.

(57) ABSTRACT

A secondary battery including an electrode assembly, the electrode assembly including a first electrode plate, a separator, and a second electrode plate; a case, the case accommodating the electrode assembly; a first current collector and a second current collector electrically connected to the first electrode plate and the second electrode plate of the electrode assembly, respectively; and a short inducing member disposed between the first current collector and the second current collector, the short inducing member being configured to electrically short-circuit the first current collector and the second current collector when a shape of the case is changed.

19 Claims, 7 Drawing Sheets

SECONDARY BATTERY

BACKGROUND

1. Field

Embodiments relate to a secondary battery.

2. Description of the Related Art

Secondary batteries are batteries that can be repeated charged and discharged, unlike primary batteries that cannot be recharged. Secondary batteries are widely used in high-technology electronic devices, e.g., cellular phones, laptops, and camcorders, and may also be used for vehicles.

Secondary batteries may include an electrode assembly and an electrolyte. The electrode assembly may include a positive plate, a negative plate, and a separator. The electrolyte may mostly include a lithium ion. The positive plate and the negative plate of the electrode assembly may each include an electrode tab protruding from the electrode assembly.

The electrode assembly may be accommodated inside a case, and an electrode terminal may be exposed outside the case. The electrode tab that protrudes outside of the electrode assembly may be electrically connected to the electrode terminal. The case may have, e.g., a cylindrical shape or an angular shape.

Secondary batteries may be used in harsh environments, e.g., an environment that may expose the secondary battery to crushing or a shock. Accordingly, secondary batteries should exhibit excellent stability and reliability even in such harsh environments.

SUMMARY

Embodiments are directed to a secondary battery, which represents advances over the related art.

It is a feature of an embodiment to provide a secondary battery that exhibits excellent stability and reliability by preventing explosion in a pressurized environment due to a crushing force or a shock.

At least one of the above and other features and advantages may be realized by providing a secondary battery including an electrode assembly, the electrode assembly including a first electrode plate, a separator, and a second electrode plate; a case, the case accommodating the electrode assembly; a first current collector and a second current collector electrically connected to the first electrode plate and the second electrode plate of the electrode assembly, respectively; and a short inducing member disposed between the first current collector and the second current collector, the short inducing member being configured to electrically short-circuit the first current collector and the second current collector when a shape of the case is changed.

In the electrode assembly, the first electrode plate, the separator, and the second electrode plate may be wound in a jelly roll configuration.

The first current collector may contact the first electrode plate at an end of the electrode assembly, and the second current collector may contact the second electrode plate at another end of the electrode assembly.

The short inducing member may extend in a lengthwise direction of a circumferential surface of the jelly roll configuration of the electrode assembly.

The secondary battery may further include an insulating member disposed between the short inducing member and the electrode assembly.

The short inducing member may be coupled to the electrode assembly with insulating tape.

When the shape of the case is unchanged, the short inducing member may be electrically isolated from the first current collector and the second current collector.

When the shape of the case is unchanged, the short inducing member may be electrically connected to one of the first current collector and the second current connector and may be electrically isolated from the other of the first current collector and the second current connector.

The short inducing member may be integrated in one unit with the one of the first current collector and the second current connector that is electrically connected to the short inducing member.

The short inducing member may be attached to the one of the first current collector and the second current connector that is electrically connected to the short inducing member.

A part of at least one of the first current collector and the second current collector may be bent over the circumferential surface of the electrode assembly.

One side of the case may include an opening, and the secondary battery may include a cap plate for sealing the opening of the case.

The secondary battery may further include a degassing duct disposed between the cap plate and the short inducing member, the degassing duct forming a gas passage.

The short inducing member may be attached to a surface of the degassing duct, which faces the electrode assembly.

The degassing duct may support the electrode assembly with respect to the cap plate.

The degassing duct may be formed of an insulating material.

The short inducing member may include copper.

A degree of change in the shape of the case may correspond to a distance between the short inducing member and at least one of the first current collector and the second current collector.

The short inducing member may be configured to induce a short in the secondary battery when the shape of the case is changed in any of an X-X', Y-Y', and Z-Z' direction.

The case may be configured to change shape when an external pressure applied thereto exceeds a predetermined level, when the external pressure does not exceed the predetermined level, the short inducing member may be electrically isolated from at least one of the first current collector and the second current collector, and when the external pressure exceeds the predetermined level, the short inducing member may electrically short-circuit the first current collector and the second current collector.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
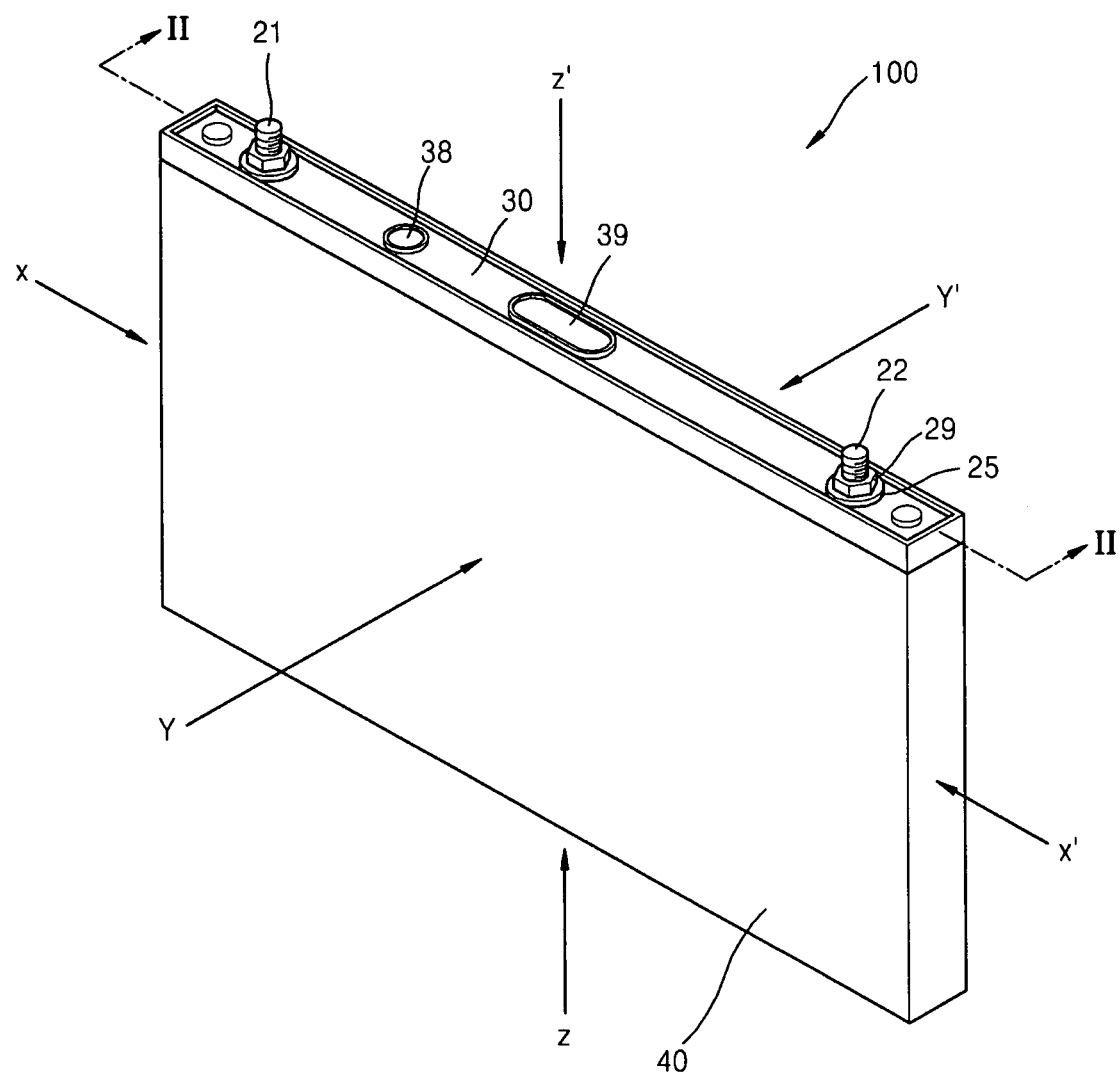
FIG. 1 illustrates a perspective view of a secondary battery according to an embodiment.

Korean Patent Application No. 10-2009-0104307, filed on Oct. 30, 2009, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
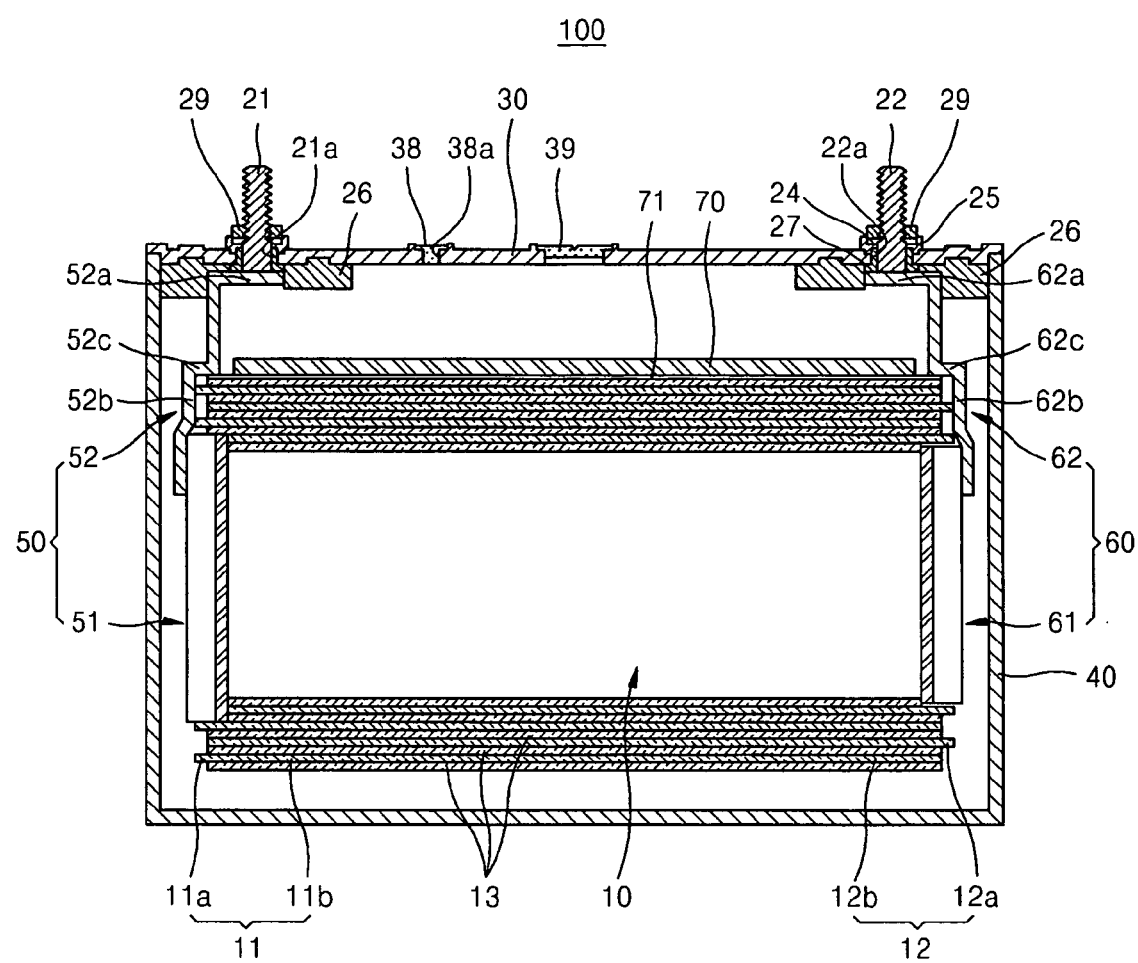
FIG. 2. illustrates a cross-sectional view taken along a line II-II of FIG. 1.
Figure 3:
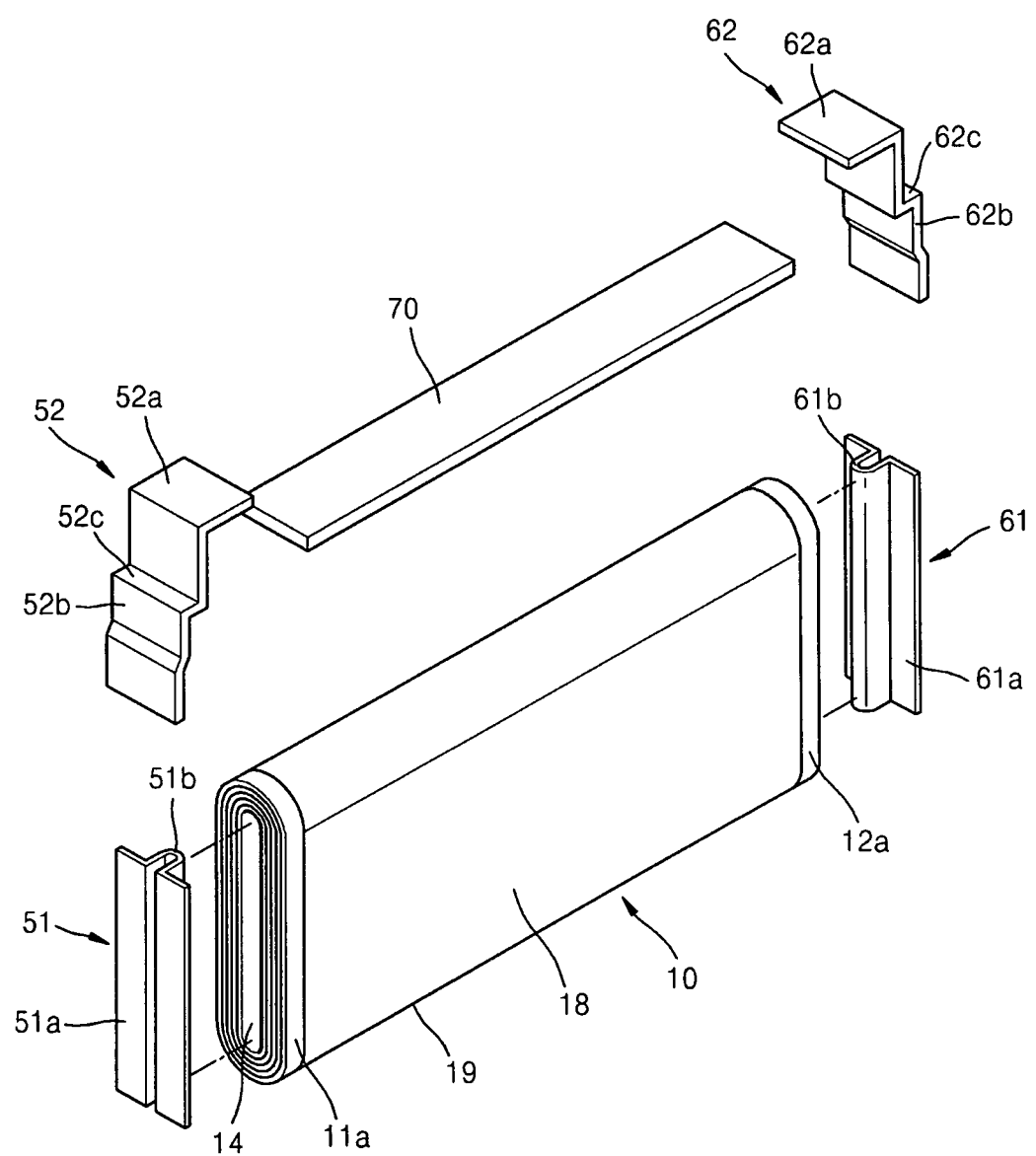
FIG. 3 illustrates a partial exploded perspective view of the secondary battery of FIG. 1, wherein a view of a short inducing member is shown in exploded view.

FIG. 1 illustrates a perspective view of a secondary battery 100 according to an embodiment. FIG. 2. illustrates a cross-sectional view taken along a line II-II of FIG. 1. FIG. 3 illustrates a partial exploded perspective view of the secondary battery 100 of FIG. 1, wherein a view of a short inducing member is shown in exploded view.

Referring to FIGS. 1 and 2, the secondary battery 100 may include an electrode assembly 10, electrode terminals 21 and 22, a cap plate 30, a case 40, current collectors 50 and 60, and a short inducing member 70. In an implementation, the secondary battery 100 may be, e.g., a lithium-ion secondary battery having an angular shape.

The electrode assembly 10 may include a first electrode plate (not illustrated), a separator 13, and a second electrode plate (not illustrated). The current collectors 50 and 60 may be electrically connected to the electrode assembly 10. The current collectors 50 and 60 may include a first current collector 50 and a second current collector 60 electrically connected to the first electrode plate and the second electrode plate, respectively. The cap plate 30 may be coupled to an open side of the case 40 so as to seal the case 40. In an implementation, in the electrode assembly 10, the first electrode plate, the separator 13, and the second electrode plate may be wound to form a jelly roll shape or configuration. In another implementation, the first electrode plate, the separator 13, and the second electrode plate may be alternatively stacked on each other.

The short inducing member 70 may be disposed between the first current collector 50 and the second current collector 60 so as to electrically short-circuit the first current collector and the second current collector if the secondary battery is exposed to an external pressure exceeding a predetermined level. When the external pressure exceeds the predetermined level, a shape of the case 40 may be changed and the short inducing member 70 may electrically short-circuit the first current collector and the second current collector.

The first current collector 50 may contact the first electrode plate at one end of the electrode assembly 10. The second current collector 60 may contact the second electrode plate at another end of the electrode assembly 10.

The electrode terminals 21 and 22 may include a first electrode terminal 21 and a second electrode terminal 22. The first electrode terminal 21 may be electrically connected to the first current collector 50, and may have a part protruding outside of the case 40 through the cap plate 30. The second electrode terminal 22 may be electrically connected to the second current collector 60, and may have a part protruding outside of the case 40 through the cap plate 30.

In the secondary battery 100 of the present embodiment, the first electrode plate may be an anode 11 and the second electrode plate may be a cathode 12. Also, the first current collector 50 may be an anode current collector 50 and the second current collector 60 may be a cathode current collector 60. Further, the first electrode terminal 21 may be an anode terminal 21 and the second electrode terminal 22 may be a cathode terminal 22.

In the electrode assembly 10, the insulating separator 13 may be disposed between the anode 11 and the cathode 12. In the jelly roll shaped electrode assembly 10, the anode 11, the cathode 12, and the separator 13 may be wound. The electrode assembly 10 may be accommodated inside the case 40. The anode terminal 21 and the cathode terminal 22 may be respectively electrically connected to the anode 11 and the cathode 12 of the electrode assembly 10, and may protrude outside of the case 40. The cap plate 30 may be coupled to the open side of the case 40.

The short inducing member 70 may be disposed inside the case 40. The short inducing member 70 may short-circuit the secondary battery according to an external pressure applied to the case 40. When the external pressure exceeds the predetermined level, the shape of the case 40 may change. When an external pressure due to, e.g., a crushing force or a shock, applied to the secondary battery exceeds a predetermined level, the short inducing member 70 may electrically short-circuit the anode 11 and the cathode 12.

When pressure is applied to the case 40, the anode current collector 50 and the cathode current collector 60 may be pressurized and may move closer to each other. When the external pressure exceeds the predetermined level, the anode current collector 50 and the cathode current collector 60 may contact the short inducing member 70 disposed therebetween. Accordingly, the anode current collector 50 and the cathode current collector 60 may be electrically connected to each other, thereby short circuiting the secondary battery.

The short inducing member 70 may be disposed in a space between the electrode assembly 10 and the cap plate 30 in the case 40. Accordingly, when the case 40 deforms, i.e., changes shape, due to pressure applied thereto, the short inducing member 70 inside the case 40 may induce the short.

During the short, the anode 11 and the cathode 12 may be electrically connected through the short inducing member 70. The short inducing member 70 may be formed of, e.g., a material having very low electric resistivity. Accordingly, the short inducing member 70 may generate very little heat during the short, and may quickly allow a large current to pass therethrough.

Accordingly, the short inducing member 70 may prevent explosion or ignition of the secondary battery 100 due to, e.g., an external shock and/or a crushing force. Thus, excellent stability and reliability of the secondary battery 100 may be obtained.

During crushing or a shock, the case 40 may be pressurized in at least one direction of an X-X', Y-Y', and Z-Z' direction illustrated in FIG. 1. Accordingly, the short inducing member 70 may be configured to induce a short-circuit even when the case 40 is exposed to pressure applied in various directions.

The anode 11 of the electrode assembly 10 may include an uncoated portion 11a and a coated portion 11b. The cathode 12 of the electrode assembly 10 may include an uncoated portion 12a and a coated portion 12b. The uncoated portions 11a and 12a may be portions on which an active material is not coated on a current collecting body formed of a thin metal foil. The coated portion 11b and 12b may be portions on which an active material is coated on the current collecting body.

The uncoated portion 11a may be disposed along a lengthwise direction of the anode 11 on a side end of the anode 11. The uncoated portion 12a may be disposed along a lengthwise direction of the cathode 12 on another side end of the cathode 12 opposite the side end of the anode 11.

In an implementation, the electrode assembly 10 may be formed by winding the anode 11, the cathode 12, and the separator 13 to form a cylinder. Then, the electrode assembly 10 may be pressed in a plate shape to have a flat portion 18 and a curved portion 19.

The flat portion 18 may be formed as a circumferential surface of the electrode assembly 10 is flattened by pressing to form a flat shape. The curved portion 19 may be formed due to the unpressed, curved circumferential surfaces of the electrode assembly 10 at each end of the flat portion 18.

The short inducing member 70 may extend in a lengthwise direction of the circumference surface of the jelly roll configuration of the electrode assembly 10. In other words, the short inducing member 70 may be disposed on the curved portion 19 between the electrode assembly 10 and the cap plate 30 in the case 40.

Also, in order to prevent the short inducing member 70 from electrically contacting the electrode assembly 10, an insulating member, e.g., an insulating film 71, may be disposed between the short inducing member 70 and the electrode assembly 10. In an implementation, in order to support the short inducing member 70 on the electrode assembly 10, the short inducing member 70 may be attached to the electrode assembly 10 by using an insulating tape.

The case 40 may have an angular cap shape having one open side. The electrode assembly 10 may be accommodated inside the case 40 through the open side of the case 40 along with an electrolyte. The cap plate 30 may cover the case 40 while the electrode terminals 21 and 22 may protrude outside of the case 40 through the cap plate 30. A boundary between the case 40 and the cap plate 30 may be welded using, e.g., a laser, and thus the case 40 accommodating the electrode assembly 10 and the electrolyte may be sealed.

The cap plate 30 may be formed of a thin plate. The cap plate 30 may include an electrolyte injecting hole 38a through which the electrolyte may be injected. A sealing plug 38 may be inserted into the electrolyte injecting hole 38a. Also, the cap plate 30 may include a vent member 39 having a groove that may rupture when an internal pressure exceeds a predetermined level.

The cap plate 30 may include terminal holes 21a and 22a penetrating the cap plate 30. The terminal holes 21a and 22a may include an anode terminal hole 21a and a cathode terminal hole 22a. The anode terminal 21 may protrude outside of the case 40 through the anode terminal hole 21a. The cathode terminal 22 may protrude outside of the case 40 through the cathode terminal hole 22a.

Gaskets 25 and 27 may be disposed between the cap plate 30 and the electrode terminals 21 and 22 so as to insulate the cap plate 30 and the electrode terminals 21 and 22. The gaskets 25 and 27 may include an upper gasket 25 and a lower gasket 27. As described above, the electrode terminals 21 and 22 may include the anode terminal 21 and the cathode terminal 22.

The lower gasket 27 may be installed in each of the terminal holes 21a and 22a by being inserted therein at the bottom of the cap plate 30. The upper gasket 25 may be installed by being inserted at the top of the cap plate 30. A washer 24 may be installed on the upper gasket 25 so as to absorb a clamping force. A screw thread may be formed on each of the anode terminal 21 and the cathode terminal 22 so as to be fastened with a nut 29. The nut 29 may support the electrode terminals 21 and 22.

In another implementation, the electrode terminals 21 and 22 may be a rivet type. Here, a part of each of the electrode terminals 21 and 22 may protrude to the outside of the case 40 through the terminal holes 21a and 22a. Then, the protruding parts of the electrode terminals 21 and 22 may be pressurized to be widely flattened while the upper gasket 25 is inserted between the terminal holes 21a and 22a and the protruding parts, so as to fix the electrode terminals 21 and 22 to the cap plate 30.

The anode current collector 50 may include an anode current collecting plate 51 and an anode lead member 52. The cathode current collector 60 may include a cathode current collecting plate 61 and a cathode lead member 62. The current collecting plates 51 and 61 may include the anode current collecting plate 51 and the cathode current collecting plate 61. The lead members 52 and 62 may include the anode lead member 52 and the cathode lead member 62.

The anode current collecting plate 51 may be attached to the uncoated portion 11a of the electrode assembly 10 by, e.g., welding. The anode current collecting plate 51 may be electrically connected to the anode terminal 21 through the anode lead member 52. Accordingly, the anode terminal 21 may be connected to the anode 11 of the electrode assembly 10 through the anode lead member 52 and the anode current collecting plate 51.

Also, the cathode current collecting plate 61 may be attached to the uncoated portion 12a of the electrode assembly 10 by, e.g., welding. The cathode current collecting plate 61 may be electrically connected to the cathode terminal 22 through the cathode lead member 62. Accordingly, the cathode terminal 22 may be connected to the cathode 12 of the electrode assembly 10 through the cathode lead member 62 and the cathode current collecting plate 61.

An insulating member 26 may be installed between the lead members 52 and 62 and the cap plate 30. The lead members 52 and 62 may include terminal lead units 52a and 62a, current collecting lead units 52b and 62b, and bending units 52c and 62c. The terminal lead units 52a and 62a may be respectively attached and electrically connected to the electrode terminals 21 and 22. The current collecting lead units 52b and 62b may be respectively attached and electrically connected to the current collecting plates 51 and 61.

The bending units 52c and 62c may include an anode bending unit 52c and a cathode bending unit 62c and may bend above the circumferential surface of the electrode assembly 10 between the terminal lead units 52a and 62a and the current collecting lead units 52b and 62b. Accordingly, when external pressure exceeding a predetermined level is applied to the case 40, the shape of the case 40 may change, and the short inducing member 70 may easily contact the anode lead member 52 and the cathode lead member 62.

When external pressure is applied to the case 40, the shape of the case 40 may change. Further, the anode bending unit 52c and the cathode bending unit 62c may slide on the electrode assembly 10 on which the insulating film 71 is disposed.

Thus, the anode lead member 52 and the cathode lead member 62 may be electrically short-circuited through the short inducing member 70.

In FIGS. 2 and 3, the anode lead member 52 and the cathode lead member 62 are illustrated as respectively including the bending units 52c and 62c. However, in another implementation, either of the bending units 52c and 62c may be included in the anode lead member 52 or the cathode lead member 62.

In an implementation, the anode terminal 21 or the cathode terminal 22 may not include the upper gasket 25, the insulating member 26, and the lower gasket 27 for electrically separating the cap plate 30 and the anode 11 or for electrically separating the cap plate 30 and the cathode 12.

For example, the upper gasket 25 and the lower gasket 27 may not be installed between the anode terminal 21 and the cap plate 30, and the insulating member 26 may not be installed between the anode lead member 52 of the anode terminal 21 and the cap plate 30.

Thus, the anode terminal 21 may contact the cap plate 30 by directly penetrating through the anode terminal hole 21a without the upper gasket 25 and the lower gasket 27. Further, the anode lead member 52 may directly contact the cap plate 30. Accordingly, the cap plate 30 and the case 40 may have the same polarity as the anode terminal 21.

The secondary battery 100 according to the present embodiment may be, e.g., a lithium-ion battery, but is not limited thereto. In another implementation, the secondary battery 100 may be, e.g., a nickel-cadmium battery, a nickel-hydrogen battery, or other batteries including a lithium battery.

As illustrated in FIG. 1, the secondary battery 100 may have an angular shape. However, the shape of the secondary battery 100 is not limited thereto, and may have different shapes, e.g., a cylindrical shape or a pouch shape.

In FIG. 3, the view of the short inducing member 70 is exploded along with the electrode assembly 10 and the current collectors 50 and 60. The short inducing member 70 may have a predetermined thickness, and may have a thin plate shape extending in a lengthwise direction of the jelly roll structure of the electrode assembly 10.

When external pressure is not applied to the secondary battery, i.e., in a normal state of operation, the case 40 may retain its original shape, an the short inducing member 70 may be electrically isolated from the anode current collector 50 and the cathode current collector 60. When external pressure that exceeds a predetermined level is applied to the secondary battery, the shape of the case 40 may change, and the short inducing member 70 may be electrically connected to the electrode assembly 10 through the lead members 52 and 62 and the current collecting plates 51 and 61, thereby short-circuiting the anode 11 and the cathode 12.

According to another embodiment, when external pressure is not applied to the secondary battery, i.e., in a normal state of operation, the short inducing member 70 may be electrically connected to one of the anode current collector 50 and the cathode current collector 60 and may be electrically isolated from the other. Here, the short inducing member 70 may be, e.g., attached to or integrated as one body with, whichever of the anode current collector 50 and the cathode current collector 60 that is electrically connected to the short inducing member 70, by, e.g., welding or a similar method.

An amount of pressure that induces a short by the short inducing member 70 may be determined on an experimental basis. Here, a distance between the short inducing member 70 and the anode current collector 50 and/or a distance between the short inducing member 70 and the cathode current collector 60 may be selected in such a way that a short may be induced according to a predetermined pressure applied to the case 40. In other words, the predetermined level of external pressure required to induce a short in the secondary battery may be determined according to a size, shape, and location, i.e., configuration, of the short inducing member 70 relative to the anode current collector 50 and/or the cathode current collector 60.

The short inducing member 70 may be formed of a material having very low electric resistivity. The short inducing member 70 may be formed of a metallic material having low resistivity, e.g., copper (Cu), aluminum (Al), and/or iron (Fe). In an implementation, the short inducing member 70 may be formed of the same material as the anode lead member 52 or the cathode lead member 62.

The anode 11, the anode current collecting plate 51, and the anode lead member 52, which may be electrically connected to each other, may all include the same material, e.g., aluminum. In addition, the cathode 12, the cathode current collecting plate 61, and the cathode lead member 62, which may be electrically connected to each other, may all include the same material, e.g., copper. In this case, the short inducing member 70 may include, e.g., copper, which has a lower electric resistivity than aluminum.

Since the short inducing member 70 may be formed of a material having low electric resistivity, the short inducing member 70 may generate little heat during a short and may quickly let a large current flow. Accordingly, the short inducing member 70 may prevent explosion and/or ignition of the secondary battery 100 due to, e.g., an external shock or crushing. Thus, excellent stability and reliability of the secondary battery 100 may be obtained.

The electrode assembly 10 may be pressed flat to form a plate shape after being wound, and may have an internal space 14 at the center thereof. The current collecting plates 51 and 61 may respectively include supporting protrusions 51b and 61b, which may be inserted into the internal space 14. In addition, current collecting plates 51 and 61 may also respectively include attached plates 51a and 61a, which may be welded to sides of the electrode assembly 10 after being pressed against the uncoated portions 11a and 12a.

The supporting protrusions 51b and 61b may extend from a center of the current collecting plates 51 and 61 along a lengthwise direction of the current collecting plates 51 and 61. Heights of the supporting protrusions 51b and 61b may correspond to a height of the internal space 14 of the electrode assembly 10.

The supporting protrusions 51b and 61b may support the electrode assembly 10 by being inserted into the internal space 14 of the electrode assembly 10. Accordingly, the supporting protrusions 51b and 61b may ensure good contact between the electrode assembly 10 and the current collecting plates 51 and 61 even in the event of an external shock. The supporting protrusions 51b and 61b may not only support the electrode assembly 10 in the lengthwise direction of the internal space 14 but also in a width direction, and thus may stably support the electrode assembly 10.

The attached plates 51a and 61a may be connected to edges of the respective supporting protrusions 51b and 61b. The attached plates 51a and 61a may contact side ends of the electrode assembly 10. The uncoated portions 11a and 12a disposed at the side ends of the electrode assembly 10 may be pressed by the attached plates 51a and 61a. The side ends may denote a side surface vertical to a central axis when the electrode assembly 10 is wound.

Accordingly, the attached plates 51a and 61a and the uncoated portions 11a and 12a may contact each other over a wide area. The attached plates 51a and 61a may be attached to the side ends of the electrode assembly 10 by, e.g., laser welding. When laser welding is used, thicknesses of the current collecting plates 51 and 61 may be thicker compared to when ultrasonic welding is used. Thus, resistance within the current collecting plates 51 and 61 may be advantageously reduced.

Also, since the current collecting plates 51 and 61 may be fixed to sides of the uncoated portions 11a and 12a, an overall output of the electrode assembly 10 may be increased by decreasing areas of the uncoated portions 11a and 12a and increasing areas of the coated portions 11b and 12b.

According to the present embodiment, excellent stability and reliability of the secondary battery 100 may be obtained by preventing an explosion in a pressurized environment due to, e.g., a crushing force or a shock.

Figure 4:
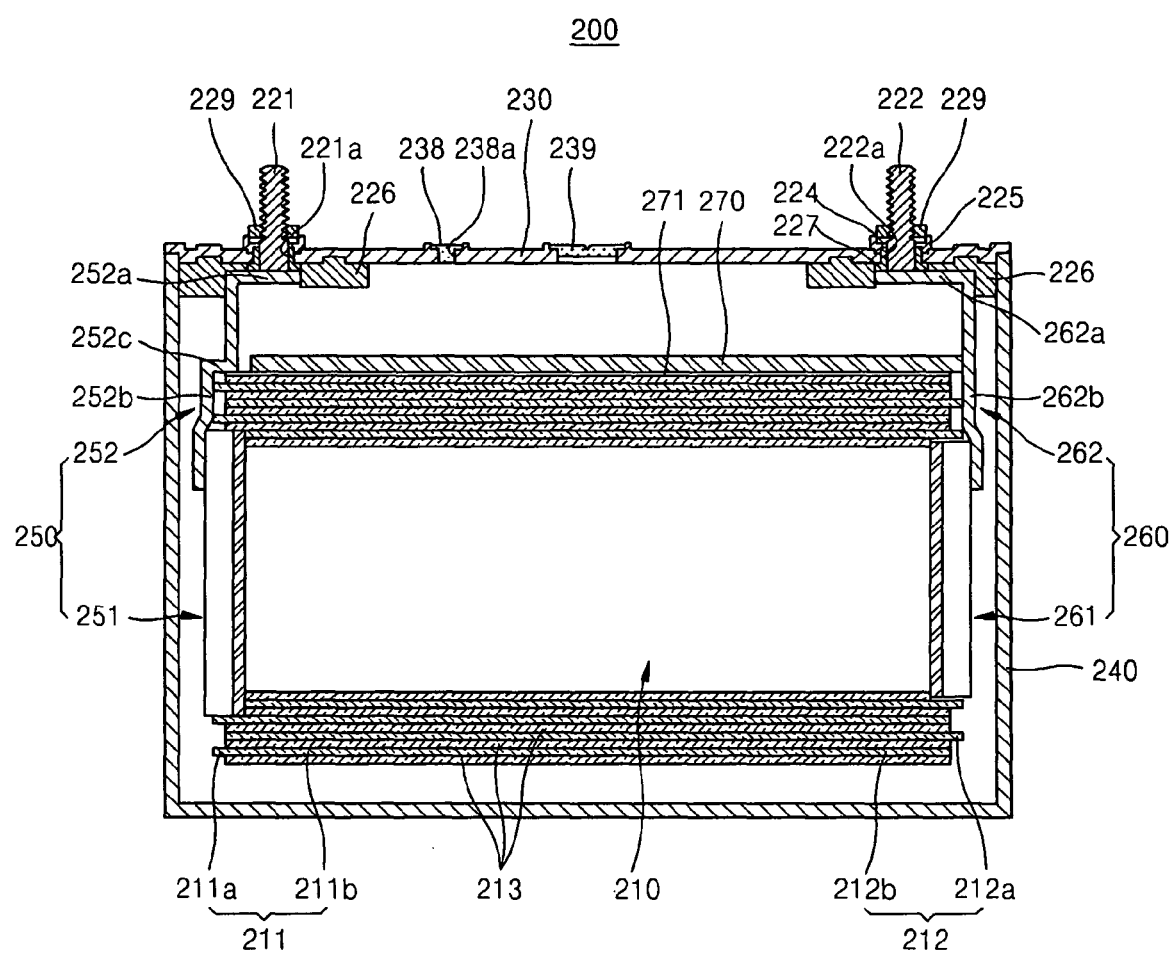
FIG. 4 illustrates a sectional view of a secondary battery according to another embodiment.
Figure 5:
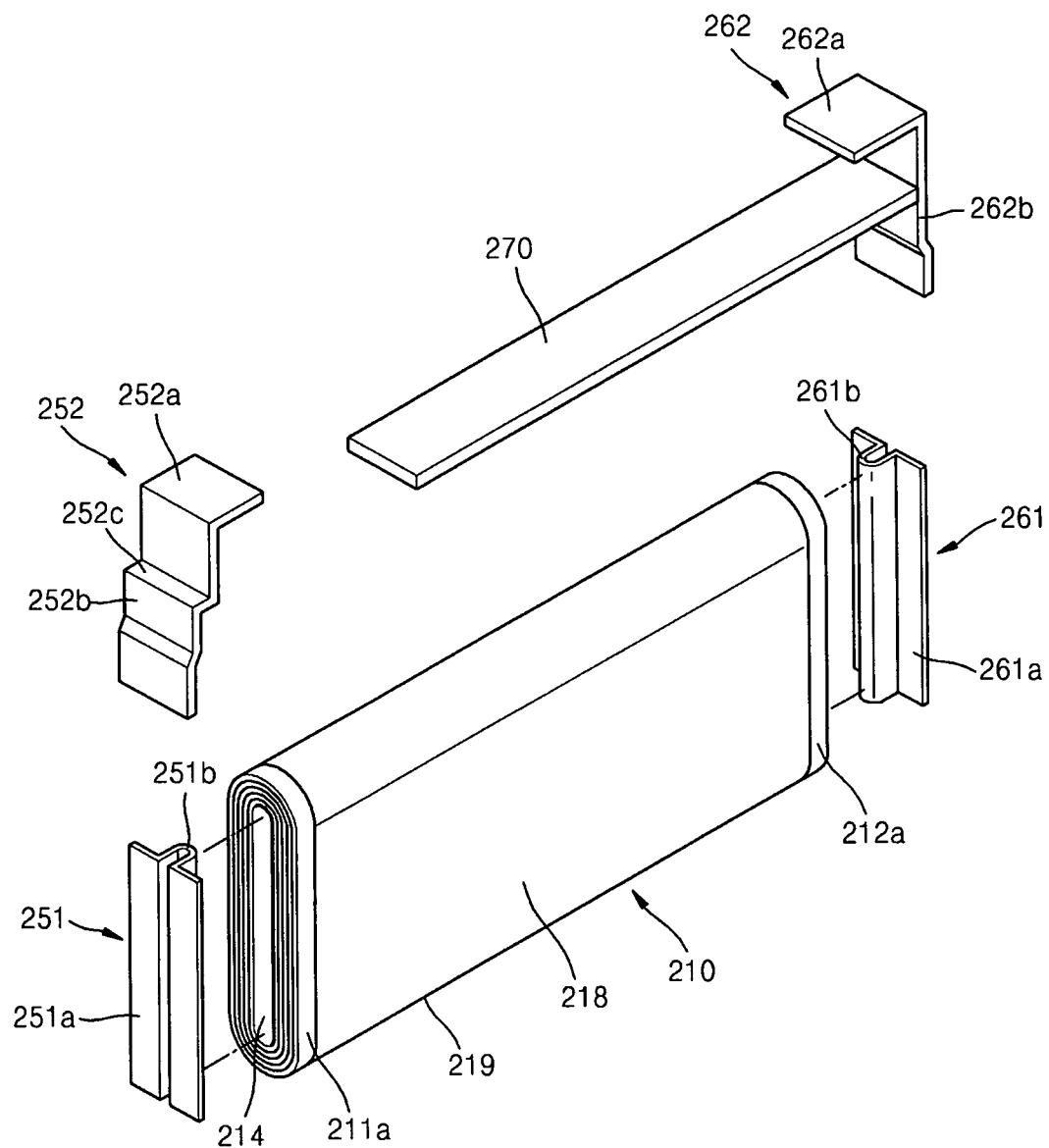
FIG. 5 illustrates a partial exploded perspective view of the secondary battery of FIG. 4, wherein a view of a short inducing member is shown in exploded view.

FIG. 4 illustrates a sectional view of a secondary battery 200 according to another embodiment. FIG. 5 illustrates a partial exploded perspective view of the secondary battery 200 of FIG. 4, wherein a view of a short inducing member 270 is shown in exploded view.

Compared to the secondary battery 100 of FIG. 2, in the secondary battery 200 according to the present embodiment, in a normal state of operation, the short inducing member 270 may be electrically connected to one of an anode current collector 250 or a cathode current collector 260 and may be electrically isolated from the other thereof.

In FIGS. 4 and 5, elements of the secondary battery 200, which are identical to the secondary battery 100 of FIGS. 1, 2 and 3, have similar reference numerals as the elements of the secondary battery 100, and repeated detailed descriptions thereof are omitted.

Referring to FIGS. 4 and 5, when no external pressure is applied to the secondary battery, i.e., in a normal state of operation, the case 240 may retain its original shape, and the short inducing member 270 may be electrically connected to the cathode current collector 260 and may be electrically isolated from the anode current collector 250. In an implementation, the short inducing member 270 may be attached to or integrated as one body with the cathode current collector 260 by; e.g., welding or a similar method.

In order to prevent the short inducing member 270 from electrically contacting an electrode assembly 210, an insulating member, e.g., an insulating film 271, may be disposed between the short inducing member 270 and the electrode assembly 210. Here, unlike the short inducing member 70 of the previous embodiment, the short inducing member 270 may not be attached to the electrode assembly 210. Thus, the short inducing member 270 may slide on the electrode assembly 210 when an external pressure is applied.

The short inducing member 270 may include a material identical to a material of a cathode lead member 262 and having small electric resistivity, e.g., copper. When the short inducing member 270 is formed of the same material as the cathode lead member 262, the short inducing member 270 may be easily attached to the cathode lead member 262 since items of the same material may be more easily welded together.

In another implementation, when no external pressure is applied, i.e., in a normal state of operation, the case 240 may retain its original shape, and the short inducing member 270 may be electrically connected to the anode current collector 250 and electrically isolated from the cathode current collector 260. Here, the short inducing member 270 may be attached to or integrated as one body with the anode current collector 250 by, e.g., welding.

The secondary battery 200 may include the electrode assembly 210, electrode terminals 221 and 222, a cap plate 230, a case 240, current collectors 250 and 260, and the short inducing member 270.

The electrode assembly 210 may be formed by disposing an insulating separator 213 between an anode 211 and a cathode 212. The case 240 may accommodate the electrode assembly 210 therein. The electrode terminals 221 and 222 respectively include an anode terminal 221 and a cathode terminal 222.

The anode terminal 221 and the cathode terminal 222 may protrude outside of the case 240 and may be respectively electrically connected to the anode 211 and the cathode 212 of the electrode assembly 210. The cap plate 230 may be coupled to an open side of the case 240. The current collectors 250 and 260 may include the anode current collector 250 and the cathode current collector 260 and may be respectively electrically connected to the anode 211 and the cathode 212.

The short inducing member 270 may be disposed between the anode current collector 250 and the cathode current collector 260 so as to electrically short-circuit the anode current collector 250 and the cathode current collector 260 if the secondary battery is exposed to an external pressure exceeding a predetermined level or a pressure of a level sufficient to change the shape of the case 240. Accordingly, excellent stability and reliability of the secondary battery 200 may be obtained by preventing explosion and/or ignition of the secondary battery 200 due to an external shock or crushing.

The anode 211 may include an anode uncoated portion 211a and an anode coated portion 211b. The cathode 212 may include a cathode uncoated portion 212a and a cathode coated portion 212b. The anode terminal 221 may protrude outside of the case 240 through an anode terminal hole 221a, and the cathode terminal 222 may protrude outside of the case 240 through a cathode terminal hole 222a.

An electrolyte injecting hole 238a may be formed on the cap plate 230. A sealing plug 238 may be inserted in the electrolyte injecting hole 238a. A vent member 239 may be installed on the cap plate 230. An upper gasket 225 and a lower gasket 227 may be disposed between the cap plate 230 and the anode terminal 221 and the cathode terminal 222 so as to insulate the cap plate 230 and the anode terminal 221 and the cathode terminal 222. A washer 224 for buffering, i.e., absorbing, a clamping force may be installed on the upper gasket 225. The anode terminal 221 and the cathode terminal 222 may be fastened to a nut 229. Alternatively, the anode terminal 221 and the cathode terminal 222 may be a rivet type.

An anode current collecting plate 251 and a cathode current collecting plate 261 may be respectively attached to the anode uncoated portion 211a and the cathode uncoated portion 212a of the electrode assembly 210 by, e.g., welding. The anode current collecting plate 251 may be electrically connected to the anode terminal 221 through an anode lead member 252. The cathode current collecting plate 261 may be electrically connected to the cathode terminal 222 through the cathode lead member 262. An insulating member 226 may be disposed between the anode lead member 252 and the cap plate 230 and between the cathode lead member 262 and the cap plate 230.

The insulating member 226 may be disposed between the lead members 252 and 262 and the cap plate 230. The lead members 252 and 262 may include terminal lead units 252a and 262a, and current collecting lead units 252b and 262b. The anode lead member 252 may include a bending unit 252c. The terminal lead units 252a and 262a may be respectively attached to and electrically connected to the electrode terminals 221 and 222. The current collecting lead units 252b and 262b may be attached and electrically connected to the current collecting plates 251 and 261.

The bending unit 252c may be bent over a circumferential surface of the electrode assembly 210 between an anode terminal lead unit 252a and an anode current collecting lead unit 252b. The short inducing member 270 may be attached to or integrated as one body with the cathode current collecting lead unit 262b while facing the anode current collecting lead unit 262a.

Accordingly, when an applied external pressure exceeds a predetermined level or a level sufficient to change the shape of the case 240, the short inducing member 270 may easily contact the anode lead member 252. In another implementation, the cathode lead member 262 may include a bending unit instead of the anode lead member 252. In still another implementation, both of the anode lead member 252 and the cathode lead member 262 may include a bending unit.

According to the present embodiment, stability and reliability of the secondary battery 200 may be obtained by preventing an explosion in a pressurized environment caused by, e.g., a crushing force or a shock.

Figure 6:
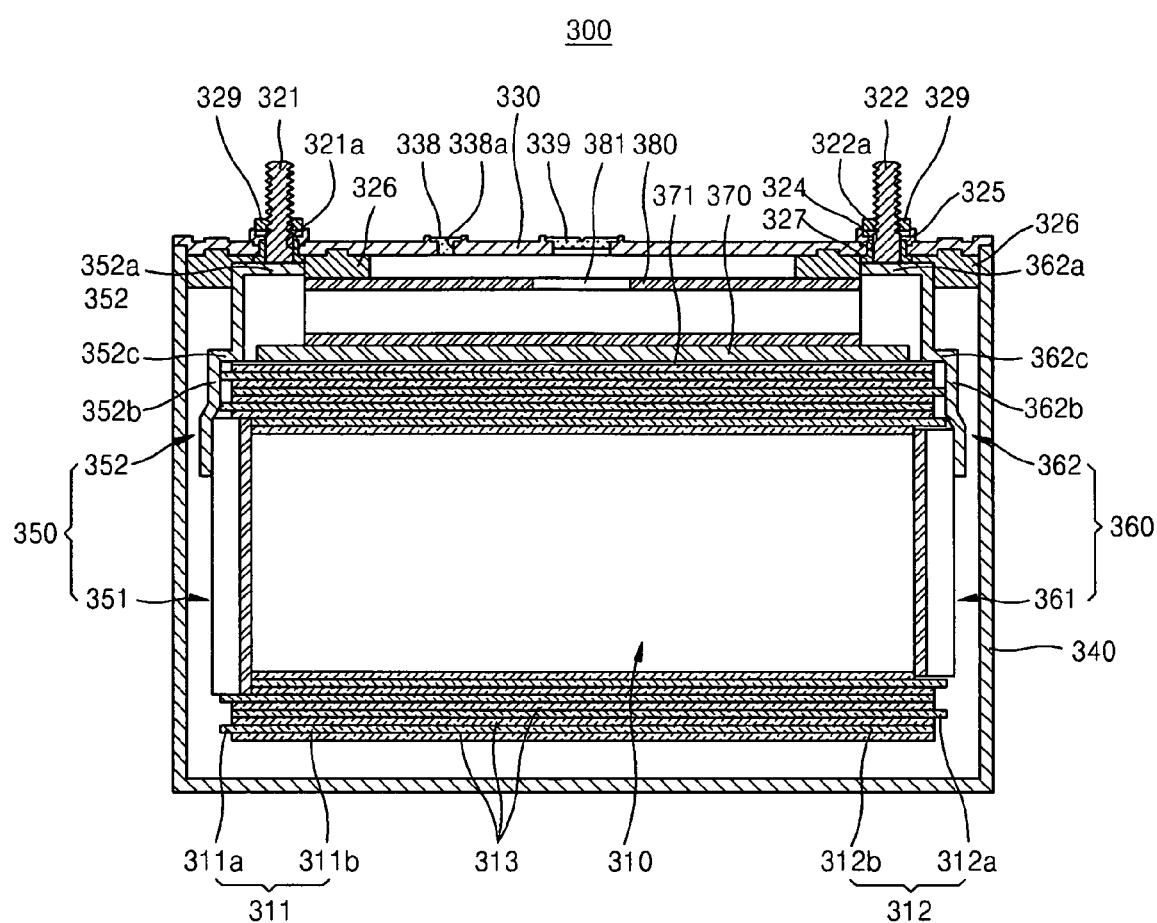
FIG. 6 illustrates a sectional view of a secondary battery according to yet another embodiment.
Figure 7:
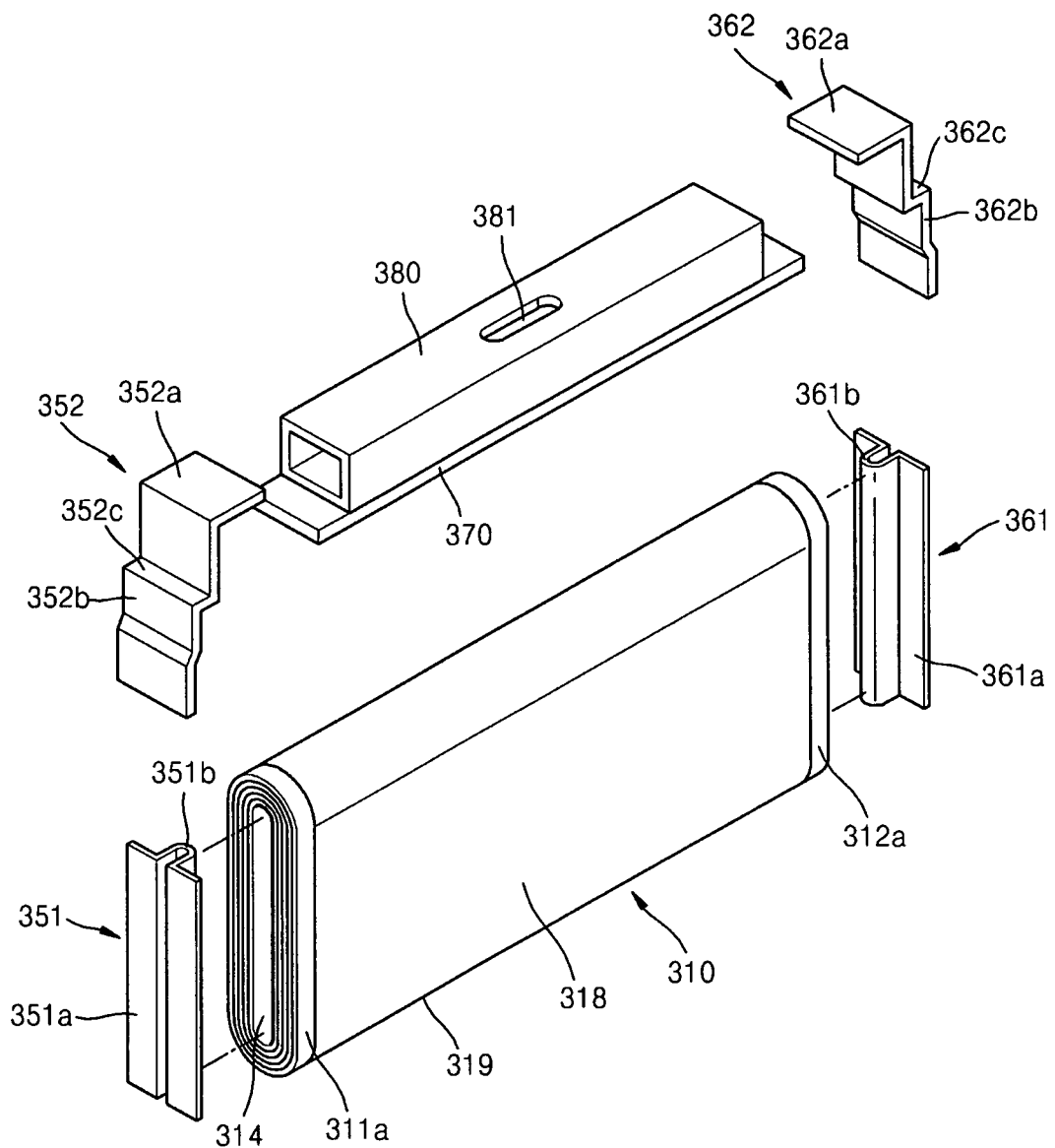
FIG. 7 illustrates a partial exploded perspective view of the secondary battery of FIG. 6, wherein a view of a short inducing member is shown in exploded view.

FIG. 6 illustrates a perspective view of a secondary battery 300 according to yet another embodiment. FIG. 7 illustrates a partial exploded perspective view of the secondary battery 300 of FIG. 6, wherein a view of a short inducing member 370 is shown in exploded view.

Compared to the secondary battery 100 of FIG. 2, in the second battery 300 according to the present embodiment, the short inducing member 370 may be attached to a surface of a degassing duct 380, which may face an electrode assembly 310.

In FIGS. 6 and 7, elements of the secondary battery 300 that are identical to the secondary battery 100 of FIGS. 1, 2 and 3 have similar reference numerals as the elements of the secondary battery 100. Accordingly, repeated detailed descriptions thereof is omitted.

Referring to FIGS. 6 and 7, the degassing duct 380 may be disposed between a cap plate 330 and the short inducing member 370 so as to form a gas passage. The degassing duct 380 may form a gas passage by being disposed between the cap plate 330 and the electrode assembly 310.

The short inducing member 370 may be attached to a bottom surface of the degassing duct 380, which may face the electrode assembly 310. Accordingly, the degassing duct 380 may support the electrode assembly 310 with respect to the cap plate 330. In an implementation, the degassing duct 380 may be formed of an insulating material.

Accordingly, by attaching the short inducing member 370 below the degassing duct 380, the degassing duct 380 may effectively support the electrode assembly 310. Also, the short inducing member 370 may be supported on the electrode assembly 310 without using an adhesive tape.

Alternatively, the short inducing member 370 may be attached to the electrode assembly 310 by using an insulating tape. In an implementation, the short inducing member 370 may be firmly supported on the electrode assembly 310.

In order to prevent the short inducing member 370 from being electrically connected to the electrode assembly 310, an insulating member, e.g., an insulating film 371, may be disposed between the short inducing member 370 and, the electrode assembly 310.

When no external pressure is applied, i.e., in a normal state of operation, the short inducing member 370 may be electrically isolated from an anode current collector 350 and a cathode current collector 360. When external pressure is applied, e.g., above a predetermined level or a level sufficient to change the shape of the case 340, the short inducing member 370 may be electrically connected to the electrode assembly 310 through lead members 352 and 362 and current collecting plates 351 and 361, thereby short-circuiting the anode 311 and the cathode 312.

According to another embodiment, when no external pressure is applied, i.e., in a normal state of operation, the short inducing member 370 may be electrically connected to one of the anode current collector 350 or the cathode current collector 350, and may be electrically isolated from the other. Here, the short inducing member 370 may be attached to or integrated as one body with whichever of the anode current collector 350 and the cathode current collector 35 that is connected to the short inducing member 370 by using, e.g., welding.

The short inducing member 370 may be formed of the same material as the anode lead member 352 or the cathode lead member 362. The short inducing member 370 may be formed of a material having low electric resistivity. In an implementation, the short inducing member 370 may be formed of a metallic material having low resistivity, e.g., copper, aluminum, and/or iron and in a particular implementation; the short inducing member 370 may include material having low electric resistivity, e.g., copper.

As such, since the short inducing member 370 may be formed of a material having low electric resistivity, the short inducing member 370 may generate little heat during a short and may quickly let a large current flow. Accordingly, the short inducing member 370 may prevent explosion and/or ignition of the secondary battery 300 due to, e.g., an external shock or crushing. Thus, excellent stability and reliability of the secondary battery 300 may be obtained.

The secondary battery 300 may include the electrode assembly 310, electrode terminals 321 and 322, the cap plate 330, a case 340, current collectors 350 and 360, and the short inducing member 370.

The electrode assembly 310 may be formed by disposing a separator 313 constituting an insulator between the anode 311 and the cathode 312. The case 340 may accommodate the electrode assembly 310 therein. The electrode terminals 321 and 322 may respectively include an anode terminal 321 and a cathode terminal 322.

The anode terminal 321 and the cathode terminal 322 may protrude outside of the case 340 and may be respectively electrically connected to the anode 311 and the cathode 312 of the electrode assembly 310. The cap plate 330 may be coupled to an open side of the case 340. The current collectors 350 and 360 may respectively include the anode current collector 350 and the cathode current collector 360, which may be respectively electrically connected to the anode 311 and the cathode 312.

The short inducing member 370 may be disposed between the anode current collector 350 and the cathode current collector 360, thereby electrically short-circuiting the anode current collector 350 and the cathode current collector 360 when an external pressure exceeds a predetermined level or a level sufficient to change the shape of the case 340. Accordingly, excellent stability and reliability of the secondary battery 300 are obtained by preventing the secondary battery from exploding and/or igniting due to an external shock or crushing.

The anode 311 may include an anode uncoated portion 311a and an anode coated portion 311b. The cathode 312 may include a cathode uncoated portion 312a and a cathode coated portion 312b. The anode terminal 321 may protrude outside of the case 340 through an anode terminal hole 321a. The cathode terminal 322 may protrude outside of the case 340 through a cathode terminal hole 322a.

The cap plate 330 may include an electrolyte injecting hole 338a, a sealing plug 338 in the electrolyte injecting hole 338a, and a vent member 339 on the cap plate 330. The degassing duct 380 may include a gas outlet 381 for exhausting gas at a location corresponding to the vent member 339. In other words, the degassing duct 380 may be disposed below the vent member 339.

An upper gasket 325 and a lower gasket 327 may each be disposed between the cap plate 330 and the anode terminal 321 and the cathode terminal 322, so as to insulate the cap plate 330 and the anode terminal 321 and the cathode terminal 322. A washer 324 for buffering, i.e., absorbing, a clamping force may be installed on the upper gasket 325. The anode terminal 321 and the cathode terminal 322 may be fastened with a nut 329. Alternatively, the anode terminal 321 and the cathode terminal 322 may be a rivet type.

An anode current collecting plate 351 and a cathode current collecting plate 361 may be respectively attached to the anode uncoated portion 311a and the cathode uncoated portion 312a of the electrode assembly 310 by, e.g., welding. The anode current collecting plate 351 may be electrically connected to the anode terminal 321 through the anode lead member 352. The cathode current collecting plate 361 may be electrically connected to the cathode terminal 322 through the cathode lead member 352. An insulating member 326 may be installed between the cap plate 330 and the anode lead member 352 and the cathode lead member 362.

The insulating member 326 may be installed between the lead members 352 and 362 and the cap plate 330. The lead members 352 and 362 may include terminal lead units 352a and 362a, current collecting lead units 352b and 362b, and at least one bending unit 352c and/or 362c. The terminal lead units 352a and 362a may be respectively attached to and electrically connected to the electrode terminals 321 and 322. The current collecting lead units 352b and 362b may be respectively attached and electrically connected to the current collecting plates 351 and 361.

The bending units 352c and 362c may be bent over a circumferential surface of the electrode assembly 310 between the terminal lead units 352a and 362a and the current collecting lead units 352b and 362b. Accordingly, when an applied external pressure exceeds a predetermined level, the short inducing member 370 may easily contact the anode lead member 352 and the cathode lead member 362. Thus, when the applied external pressure exceeds the predetermined level or a level sufficient to change the shape of the case 340, the short inducing member 370 may easily contact the anode lead member 352.

In an implementation, a bending unit may be installed only in the cathode lead member 362, or only in the anode lead member 352.

According to the present embodiment, excellent stability and reliability of the secondary battery 300 may be obtained by preventing an explosion in a pressurized environment caused by a crushing force or a shock.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
    an electrode assembly, the electrode assembly including a first electrode plate, a separator, and a second electrode plate;
    a case, the case accommodating the electrode assembly;
    a first current collector and a second current collector electrically connected to the first electrode plate and the second electrode plate of the electrode assembly, respectively; and
    an electrically conductive short inducing member disposed between the first current collector and the second current collector, the short inducing member being configured to electrically short-circuit the first current collector and the second current collector when a shape of the case is changed, wherein, when the shape of the case is unchanged, the short inducing member is electrically isolated from the first current collector and the second current collector,
    wherein a degree of change in the shape of the case corresponds to a sum of:
        a distance between the short inducing member and the first current collector, and
        a distance between the short inducing member and the second current collector.

2. The secondary battery of claim 1, wherein, in the electrode assembly, the first electrode plate, the separator, and the second electrode plate are wound in a jelly roll configuration.

3. The secondary battery of claim 2, wherein:
    the first current collector contacts the first electrode plate at an end of the electrode assembly, and
    the second current collector contacts the second electrode plate at another end of the electrode assembly.

4. The secondary battery of claim 3, wherein the short inducing member extends in a lengthwise direction of a circumferential surface of the jelly roll configuration of the electrode assembly.

5. The secondary battery of claim 4, further comprising an insulating member disposed between the short inducing member and the electrode assembly.

6. The secondary battery of claim 4, wherein the short inducing member is coupled to the electrode assembly with insulating tape.

7. The secondary battery of claim 4, wherein a part of at least one of the first current collector and the second current collector is bent over the circumferential surface of the electrode assembly.

8. The secondary battery of claim 5, wherein one side of the case includes an opening, and the secondary battery includes a cap plate for sealing the opening of the case.

9. The secondary battery of claim 8, further comprising a degassing duct disposed between the cap plate and the short inducing member, the degassing duct forming a gas passage.

10. The secondary battery of claim 9, wherein the short inducing member is attached to a surface of the degassing duct, which faces the electrode assembly.

11. The secondary battery of claim 10, wherein the degassing duct supports the electrode assembly with respect to the cap plate.

12. The secondary battery of claim 10, wherein the degassing duct is formed of an insulating material.

13. The secondary battery of claim 1, wherein the short inducing member includes copper.

14. The secondary battery of claim 1, wherein the short inducing member is configured to induce a short in the secondary battery when the shape of the case is changed in any of an X-X', Y-Y', and Z-Z' direction.

15. The secondary battery as claimed in claim 1, wherein:
the case is configured to change shape when an external pressure applied thereto exceeds a predetermined level,
when the external pressure does not exceed the predetermined level, the short inducing member is electrically isolated from at least one of the first current collector and the second current collector, and
when the external pressure exceeds the predetermined level, the short inducing member electrically short-circuits the first current collector and the second current collector.

16. A secondary battery, comprising:
an electrode assembly, the electrode assembly including a first electrode plate, a separator, and a second electrode plate;
a case, the case accommodating the electrode assembly;
a cap plate on the case;
a first current collector and a second current collector electrically connected to the first electrode plate and the second electrode plate of the electrode assembly, respectively;
an electrically conductive short inducing member disposed between the first current collector and the second current collector, the short inducing member being configured to electrically short-circuit the first current collector and the second current collector when a shape of the case is changed, wherein, when the shape of the case is unchanged, the short inducing member is electrically isolated from the first current collector and the second current collector; and
a degassing duct between the cap plate and the short inducing member, the degassing duct forming a gas passage.

17. The secondary battery of claim 16, wherein the short inducing member is attached to a surface of the degassing duct, which faces the electrode assembly.

18. The secondary battery of claim 17, wherein the degassing duct supports the electrode assembly with respect to the cap plate.

19. The secondary battery of claim 17, wherein the degassing duct is formed of an insulating material.

* * * * *